United States Patent [19]
Takada et al.

[11] 3,938,382
[45] Feb. 17, 1976

[54] METHOD AND APPARATUS FOR DETECTING SHAPE OF FLAT PRODUCTS

[75] Inventors: Tsutomu Takada; Toshio Toyota; Akinobu Ogasawara; Syunsuke Yamato, all of Kitakyushu, Japan

[73] Assignee: Nippon Steel Corporation, Tokyo, Japan

[22] Filed: Sept. 24, 1973

[21] Appl. No.: 400,121

[30] Foreign Application Priority Data
Sept. 29, 1972 Japan.............................. 47-97816

[52] U.S. Cl..................................... 73/144; 73/104
[51] Int. Cl.²........................................... G01L 5/10
[58] Field of Search...................... 73/144, 159, 104

[56] References Cited
UNITED STATES PATENTS
| | | | |
|---|---|---|---|
| 3,324,695 | 6/1967 | Sivilotti | 73/144 UX |
| 3,334,508 | 8/1967 | Martin | 73/144 X |
| 3,481,194 | 12/1969 | Sivilotti et al. | 73/144 |
| 3,538,765 | 11/1970 | Jesinghaus et al. | 73/144 |
| 3,599,485 | 8/1971 | Muhlberg | 73/144 |
| 3,850,031 | 11/1974 | Schwenzfeier et al. | 73/159 X |

*Primary Examiner*—Jerry W. Myracle
*Attorney, Agent, or Firm*—Wenderoth, Lind & Ponack

[57] ABSTRACT

A method of detecting the shape of flat products, which comprises applying, through an exciter, to an examined objects in its width, exciting signal generated in an exciting signal generator, as an exciting force, concurrently detecting the deflection of said examined object taking place due to the application of such exciting force at a plurality of points on said examined object in the width direction, correlating the exciting signal and the so detected values of deflection in the signal processing circuit, and determining the tension of said examined object at respective points on said examined object. The tension distribution on said examined object, in the width direction can therefore by determined, whereby the shape of said examined object can be ascertained.

7 Claims, 5 Drawing Figures

METHOD AND APPARATUS FOR DETECTING SHAPE OF FLAT PRODUCTS

BACKGROUND OF THE INVENTION

1. Field of the Invention

The present invention relates to a method and an apparatus for detecting the shape of flat products such as strip or sheet from tension distributions along the widths of the products.

2. Description of the Prior Art

Generally in cold-rolling operations for making flat products such as steel strip, exactness in shape (or "flatness") of such products, as well as that in thickness, is the key factor to the success of the operations. In fact, the cold-rolling mill operates at high tension, and if there are regions of irregularity such as center buckles or edge waves due to elastic elongation with a product, the irregular part of the shape caused by these irregular regions may be affected or even offset by such high tension, making it possible to detect the irregular shape directly by using the regions of irregularity as determinative factor.

As a means for indirectly detecting the shape of flat products, the tension distribution on flat products in the width direction heretofore been used. This idea is sound, since the fact is that the shape of flat products can be measured on the basis of the difference in length with respect to points taken along the width of the flat products, such difference causing a varied tension distribution on the flat product in response to the application of tension thereon. This makes it possible to detect the irregular part of the shape of the flat product indirectly, that is, in view of such tension distribution. Again, this method is possible because of the close relationship between the shape of flat products and the tension distribution thereon in the width direction.

The known methods of detecting the tension distribution for this purpose include a method using strain guages for a plurality of detection rolls provided separately in the width direction of flat products and a method utilizing magnetic strain. However, detection using these methods results in substantial errors caused by, for example heaving of the examined material. Moreover the number of detection elements which can be used is limited to several because of the structure of the setting device. Since their tension resolution in the width direction is low, the data obtained by using these methods is inaccurate. Because of the abovementioned and other disadvantages, these methods are still untrustworthy in the detection of tension distribution.

SUMMARY OF THE INVENTION

Having been developed to eliminate such disadvantages as mentioned above in the known tension distribution detecting methods, the present invention has an object to provide a method of detecting, with high accuracy, the tension distribution on flat products in the width direction, thereby accurately detecting the shape of the flat products.

Another object of the present invention is to provide a method of detecting the shape of flat products, which method can accurately detect the tension distribution on flat products even in the cold-rolling process where high tension is given to flat products, and which has very strong resistance against disturbances such as heaving of the flat products which occur during tension detection.

A further object of the present invention is to provide a method of detecting the irregular shape of flat products, which permits a great number of tension detecting elements to be provided along the width of the flat products, thereby providing good resolution.

Still a further object of the present invention is to provide an apparatus for practising the abovementioned method of detecting the shape of flat products.

In order to achieve the abovementioned objects, the present invention is characterized by applying, through an exciter, along the width of examined objects, exciting signal generated in a exciting signal generator. The signals change with time for generating such signals that change according to time, as an exciting force. The deflection of said examined objects, taking place due to the application of the exciting force at a plurality of points on each of said examined objects in the width direction is detected with a deflection detector, and the correlation between the so detected values of deflection and said exciting signal is determined. This correlation is input to a signal processing circuit for determining the tension at respective points on each of the examined objects, so as to develop the tension distribution along the width of each of the examined objects, whereby the shape of the examined objects may be detected.

Other objects of the present invention will become apparent by reference to the following embodiments of the present invention in the light of the accompanying drawings.

DESCRIPTION OF THE PREFERRED EMBODIMENT

Figure 1:
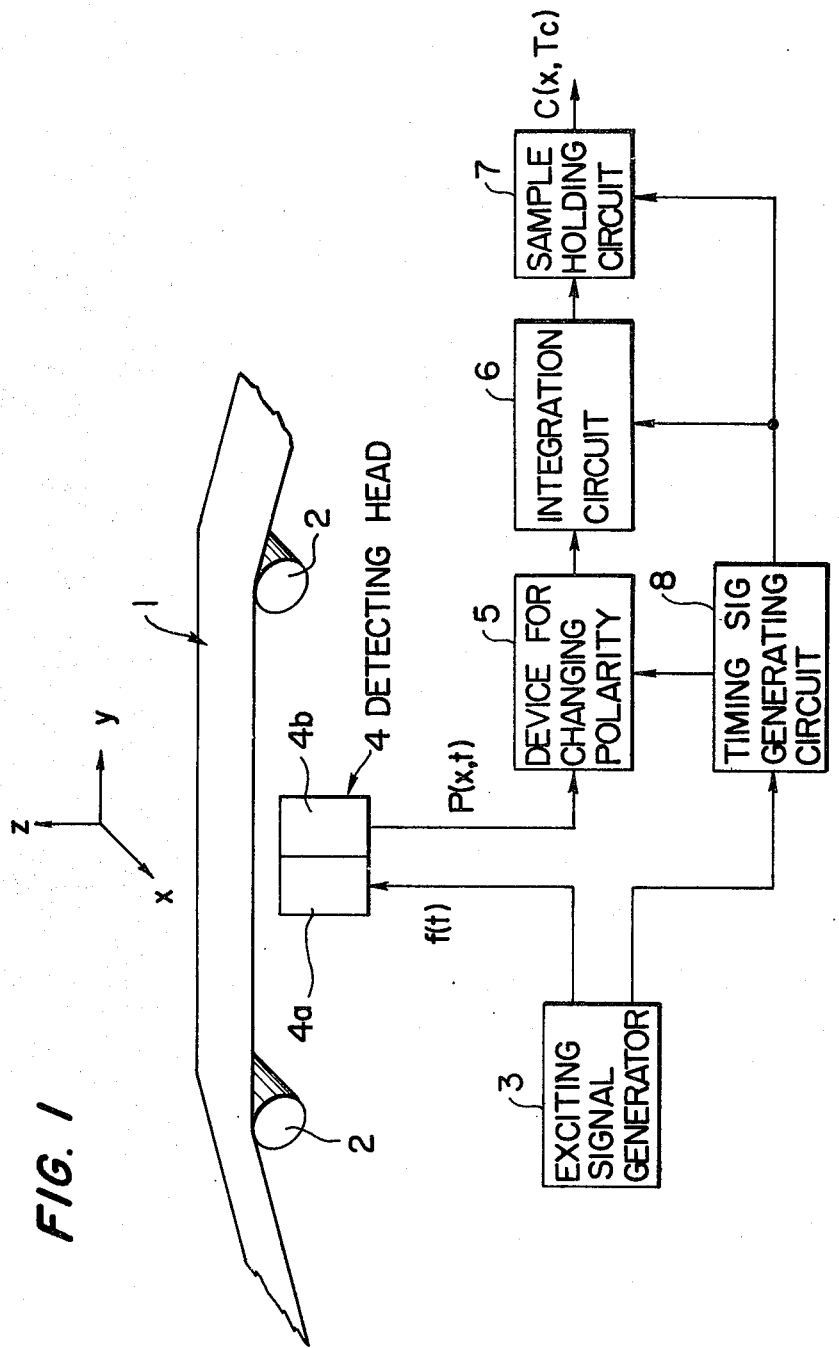
FIG. 1 is a diagram of a signal processing circuit to describe the principle of the present invention.

FIG. 1 is a block diagram showing the processing of signal through the integration of the detection signal in synchronism with the exciting signal, as an embodiment of the present invention. In FIG. 1, 1 indicates an examined object, that is, a flat product which is subjected to tension in its long lengthwise direction, by a device for applying tension 2 such as a deflector-roll, rolled by rolling rolls (not shown) and then sent in a predetermined direction. 3 indicates a exciting signal generator, such as a rectangular wave generator, that issues exciting signal with a period of $T_c$. 4 indicates a detecting head connected with said exciting signal generator 3. Said detecting head 4 includes an exciter 4a, such as an electric magnet, and also a unit 4b such as an electrode for detecting deflection. A detecting head 4 is provided at predetermined points between rolls 2, 2 on the flat product 1 along the width thereof. Rectangular wave exciting signals having a period of $T_c$ are amplified by an amplifier, not shown (which is not necessary particularly for a exciting signal generator of large capacity), and then are applied as an exciting force, through the detecting head 4, to the flat product 1. The deflection produced on the flat product 1 due to the application of the exciting force, is detected by the device for detecting deflection 4b, converted by a signal transmitter (not shown) such as an electrostatic capacity-voltage transducer, reversed in polarity change relative to the value detected by the detecting signal in a polarity changing device 5, and then input to integration circuit 6. The value of deflection detecting signal obtained by using said rectangular wave signal is integrated over the rectangular wave period in the integration circuit 6, so as to produce tension signals free of noise. Finally, it is held at sample-holding circuit 7, so as to derive an output signal C $(x,nTc)$. 8 indicates a sample-timing signal generating circuit, which is connected with the exciting signal generator 3, to control the timing of the polarity change for the polarity changing device 5, the reset timing for the integration circuit 6, for the sample-holding circuit 7 and so forth. The polarity charging device is obviously used to assure that only deflection signals of one polarity are input to the integration device.

The following is an explanation of the principle of the present invention by using equations:

If, in FIG. 1:
$x$ : Point on the co-ordinate of width direction
$f(t)$ : Exciting force per unit width
$P(x,t)$ : Deflection at $x$
$d(t)$ : Irregular vibration of flat product
$T(x)$ : Tension per unit width at $x$
$2L$ : Span between rolls ,and if the balance of power at a minimum part extended along the width of the flat products is taken into account, an appropriate value of deflection $P(x,t)$ is expressed as follows:

$$P(x,t) = \frac{L \cdot f(t)}{2 T(x)} + d(t) \quad (1)$$

Also, output $C(x,nTc)$ from the sample-holding circuit 7 is expressed as follows:

$$C(x,nTc) = \frac{1}{Tc}\left\{\int_{nTc}^{nTc + \frac{Tc}{2}} P(x,T)dt - \int_{nTc + \frac{Tc}{2}}^{(n+1)Tc} P(x,t) dt\right\} \quad (2)$$

,where
$Tc$ : Period of rectangular wave
$n$ : Number of cycles of rectangular waves Furthermore, exciting force $f(t)$ per unit width is a rectangular wave having an amplitude a, so it can be expressed as follows:

$$f(t) = \begin{cases} a + b & nTc \leq t < nTc + \frac{Tc}{2} \\ b & nTc + \frac{Tc}{2} \leq t < (n+1)Tc \end{cases} \quad (3)$$

Therefore, output $C(x,nTc)$ from the sample-holding circuit 7 can expressed, as follows, by taking the equations (1), (2) and (3) into consideration:

$$C(x,nTc) = \frac{L \cdot a}{2T(x)} + \frac{1}{Tc}\left\{\int_{nTc}^{nTc + \frac{Tc}{2}} d(t)dt - \int_{nTc + \frac{Tc}{2}}^{(n+1)Tc} d(t)dt\right\} \quad (4)$$

The second term of the above equation which shows the influence of disturbance, is considered to be much smaller than the constancy of the irregular vibration $d(t)$ of flat product, products as the period T of rectangular wave becomes greater; so the above equation may be expressed also in the following manner;

$$c(x,nTc) = \frac{L \cdot a}{2T(x)} \quad (4')$$

From the equation (4') there can be derived the tension $T(x)$ per unit width at x on the co-ordinate of width direction, can be expressed, as follows:

$$T(x) = \frac{L \cdot a}{2c(x,nTc)} \quad (5)$$

Figure 2:
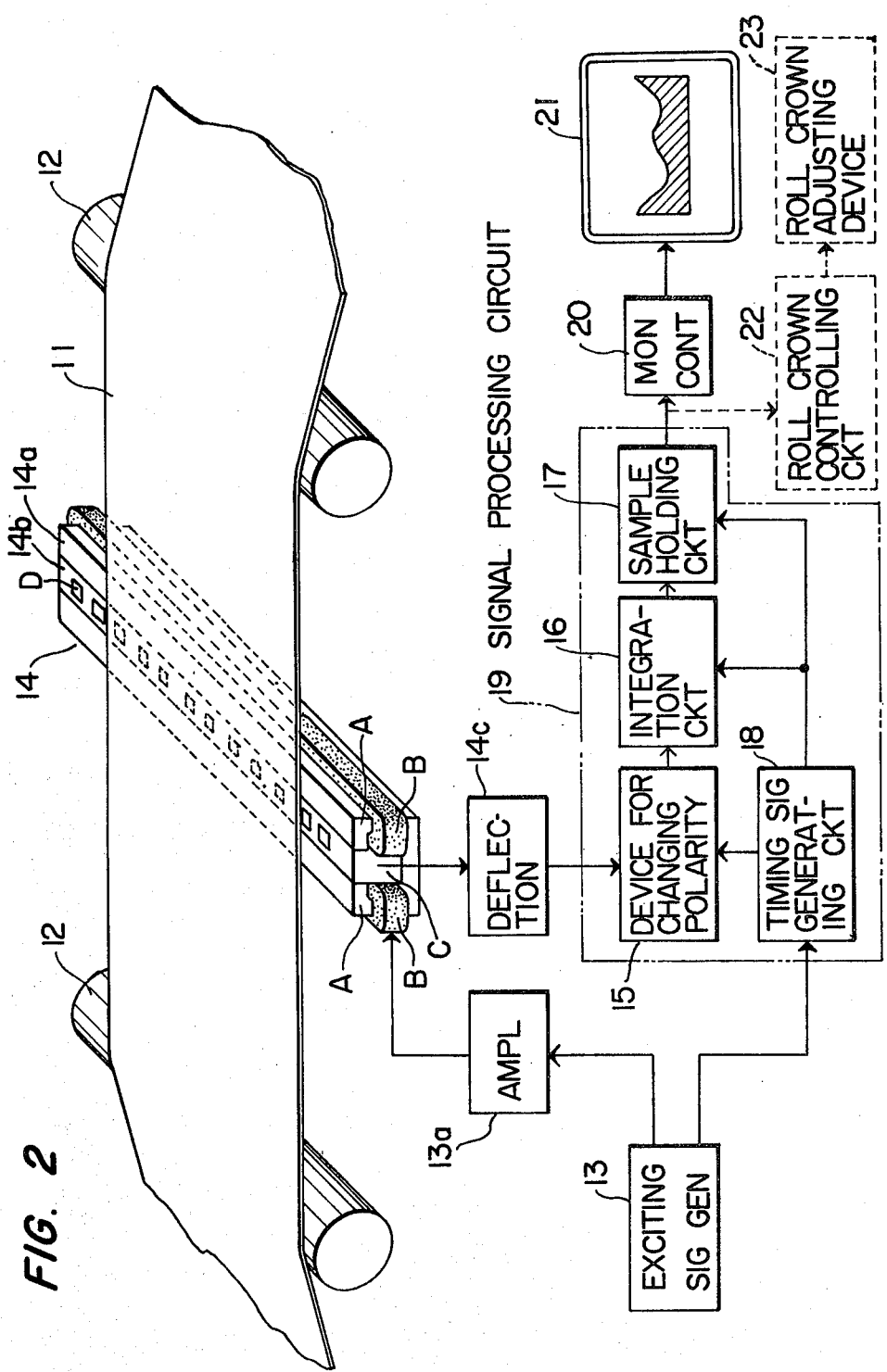
FIG. 2 is a partial perspective view and a block diagram to describe the method of the present invention.

While the detection of tension of flat products by the conventional methods has been so made that the heaving of flat products is held as low as possible, to reduce noise to a minimum, the detection according to the present invention is so different, as mentioned above, that only deflections due to the application of the rectangular wave signals are processed for detecting the tension distribution along the width of the flat products. This, in turn allows the detection of the shape of the flat products. In other words, as a result of the abovementioned process of the present invention, disturbances such as heaving which occur in rolling operations on flat products will almost completely offset each other during the course of the integration of deflection signals in synchronism with exciting signal, as mentioned in the equation (4) above, due to the constancy of the disturbances themselves. Therefore, errors caused by heaving of flat products, which constitutes the greatest disadvantage of the conventional methods, can be almost entirely eliminated by the present invention. The following is an explanation of an embodiment of the present invention by reference to the drawings:

In FIG. 2, 11 indicates an examined object, that is, a strip. 12 indicates supporting rolls such as deflector rolls. 13 indicates a exciting signal generator, which may be, for example, a rectangular wave generator. 13a indicates an amplifier. 14 indicates a detecting head positioned at an appropriate distance between the two supporting rolls on the surface of said examined object along its width by means of an appropriate holding means. Each of the detecting heads is constructed with an exciter 14a and a device for detecting deflection 14b. The exciter 14a may be an electric magnet made by adding an exciting coil B to each of the magnetic poles 7 which have the channel-shape A provided along the width of the examined object 11. It is not, however, limited to an electric magnet, but any device which can apply an external force by using non-contact force such as compressed air; that is, any means which is within the range of purposes of the present invention, can be so used. The device for detecting deflection 14b is made by providing a plurality of electrodes for detecting deflection D on the basic part C lying along the width direction of the examined object 11, in combination with the exciter 14a for applying external force.

The device for detecting deflection 14b may be provided separately from the exciter 14a. 14c indicates a deflection transmitting circuit such as an electrostatic capacity-voltage transducer. 19 indicates a signal processing circuit, which is composed of a polarity changing device 15, the integration circuit 16, the sample-holding circuit 17 and the timing signal generating circuit 18. The circuit 18 is connected respectively with the units 15, 16 and 17. The timing signal generating circuit 18 is connected also to an indicator 21 such as a CRT(cathode-ray tube) monitor through a device for controlling indicators 20. Also, the signal processing circuit 19 may be connected to a roll-crown adjusting device 23 through a roll-crown controlling circuit 22.

The polarity changing device, the integration circuit and the sample-hold circuit used for each of a plurality of the deflection detecting devices are provided in series and grouped separately for respective sets of the deflection detecting devices.

The following is an explanation of how the present invention works by reference to FIG. 2. The gist of the following explanation is just like that of the above explanation relating to the principle of the present invention.

At first, a rectangular wave having a period of Tc is generated, as an exciting signal, by the rectangular wave generator 13. Then, the generated exciting signal is amplified by the amplifier 13a, and applied, as an exciting force, to the surface of the examined object 11 by the exciter 14a, so as to produce deflections $P(x,t)$ on the examined object 11. The deflections $P(x,t)$ produced on the examined object 11, are detected, as an electrostatic capacity, by the electrodes for detecting deflection D, and converted to voltage signals by the electrostatic capacity-voltage transducer 14C. A plurality of the electrodes D, provided along the width of the examined object 11 detect deflections produced respectively in corresponding parts of the examined body in the same manner, and convert the deflections respectively into voltage signals, which are then input into a respective processing circuit 19.

Said deflection detecting signals are changed in polarity by the polarity changing device 15, and then input into the integration circuit 16, where it is subjected to integration over every period of the rectangular wave, so as to eliminate noise from the tension signal. After calculating the value relating to the tension in each part of the examined object, the signal is input into the sample-holding circuit 17 to be sample-held.

The timing signal generating circuit 18 is used to control the polarity changing timing for the polarity changing device 15, the reset timing for the integration circuit 16, and the timing for the sample-hold circuit 17, by using reference signal issued from the rectangular wave generator 13. Output from the sample-holding circuit 17 is sent through a circuit for controlling indicator 20 to an indicator 21 such as a CRT monitor, whereby operators can visually monitor the shape of the member.

The shape of the examined objects can be checked automatically by the adjustment of the roll crown by inputting the output from the sample-holding circuit 17 into the roll crown adjusting device through the automatic controlling series, that is, the roll crown controlling circuit 22.

In the above case, the rectangular wave which is applied as the exciting force to the flat product in the width direction is more effective in checking disturbances if the length of its period is somewhat greater; according to the present invention, a period ranging from 1 to 4 seconds is preferred.

Besides rectangular waves, other waves can be used as the exciting signal. For example signals which change according to time lapse such as M series signal (pseudo random signal), random signals, and sine wave can be used. In case of using such waves, there may well be provided a multiplying circuit for multiplying the exciting signal with the deflection signal, instead of the polarity exchanging device 15 provided in the signal processing circuit 19, as shown in FIG. 2.

Figure 3:
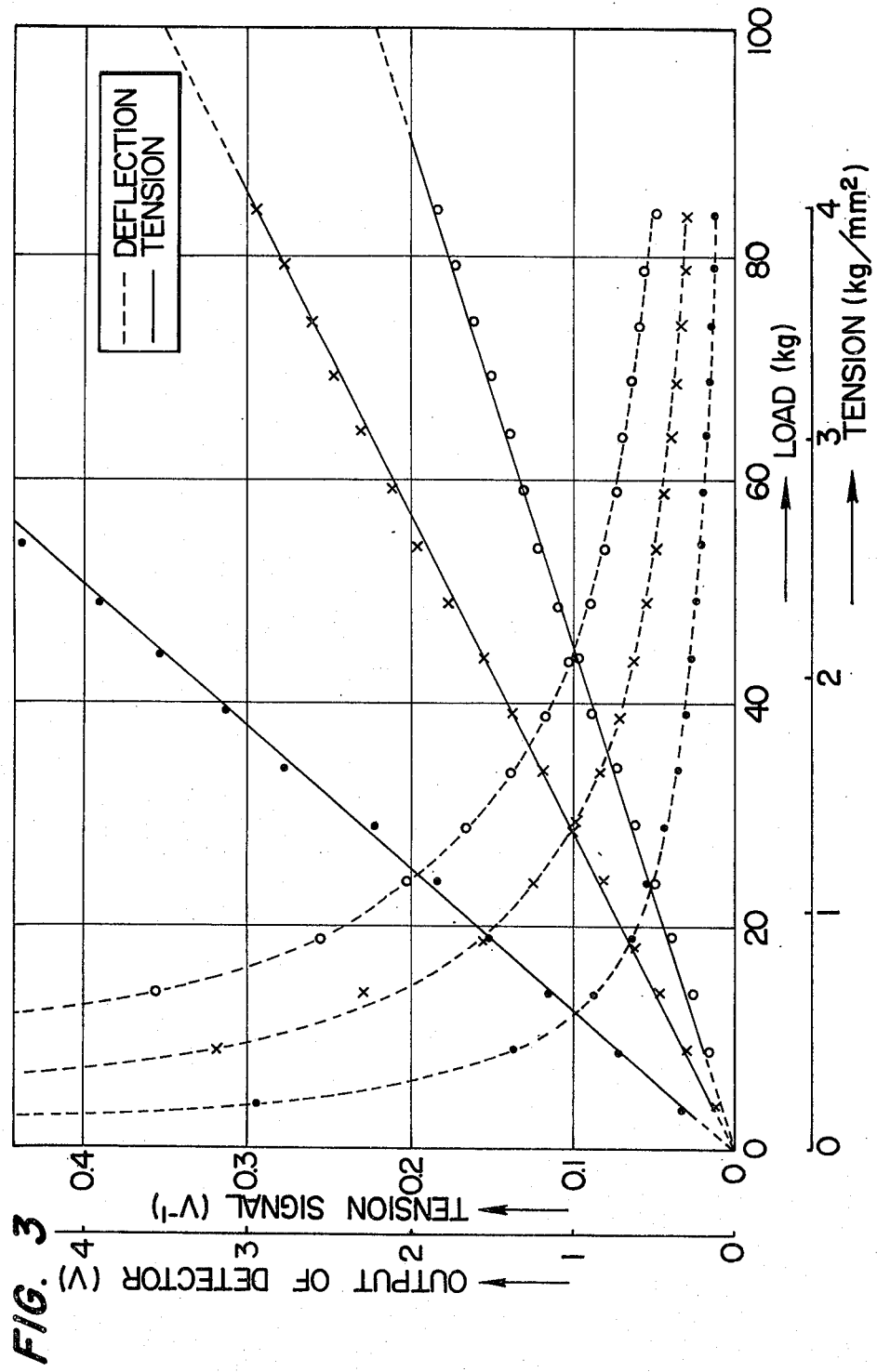
FIG. 3 is a diagram showing the correlation between the tension and the deflection detected according to the present invention.

FIG. 3 is a diagram showing the relation between values of output signals and tensions, detected according to the present invention.

The conditions used in detection are as follows:
Examined object: Steel strip, 99.2 mm wide × 0.20 mm thick
Roll span: 755 cm
Gap between magnetic pole (device for applying exciting force to strip) and strip: 11.3 mm
Gap between electrode (device for detecting deflection) and strip: 8.3 mm
Period of integration: 2 seconds
Disturbance: 0
Magnetic current: I = 1 Amp., I = 2 Amp., I = 3 Amp.

As clarified in the drawing, the output from the detector in relation to the tension of the strip, can be expressed as a straight line having high lineal tendency and very small variance, proving that the apparatus of the present invention achieves an accuracy several times higher than that of the conventional apparatus.

Figure 4:
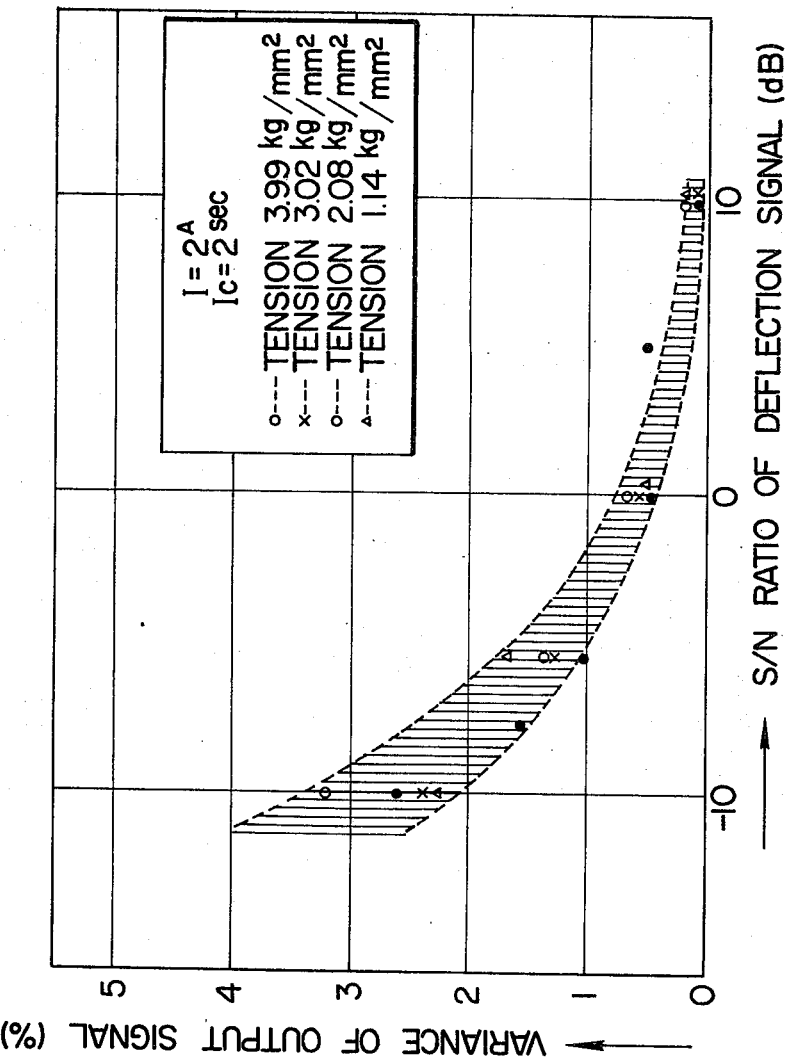
FIG. 4 is a diagram showing the range of errors due to the heaving of flat products, detected according to the present invention.

FIG. 4 shows the result of an experiment conducted to determine the influence of the heaving of flat products in the practice of the method of the present invention.

The conditions used in the determination are; Electric current: 2 Amp: period: 2 seconds; tensions applied to examined bodies: 3.02, 2.08 and 1.18 Kg/mm² (per unit common to all these case). As for disturbance, random noise was applied to the strip by a generator. As clarified in the drawing, the ratio between signal and noise (S/N ratio) was less than 0.5% of the variance of the output even at the time S/N ratio was 0 dB (that is, when the ratio between the noise due to the heaving of flat products and the heaving due to rectangular wave amplifying signal, was 1 : 1). This means that the heaving of flat products which has been the greatest problem in the conventional methods, is completely overcome by the present invention, as error due to the same can be reduced to a negligible degree.

Figure 5:
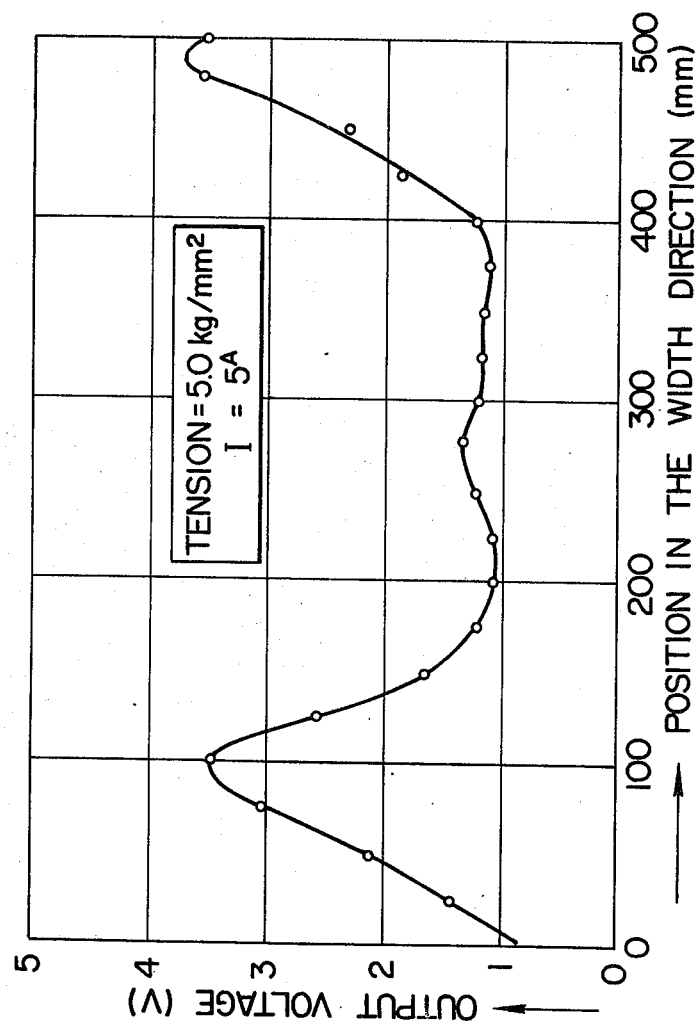
FIG. 5 is a diagram showing an embodiment of the present invention in detecting the shape of flat products.

FIG. 5 shows an output produced by embodiment of the present invention for detecting the irregular shape of flat products, The conditions used for the detection were: Magnetic current: 5 Amp.; period: 2 seconds; thickness of the examined object (cold-rolled sheet steel): 0.2 mm; width: 500 mm; tension, 5 Kg/mm². At points, 100 mm and 500 mm along the width of the examined object in the width direction, there were, respectively, a pocket quarter buckle having a steepness (percentage obtained in terms of crest value and pitch of the waves of the object) of 1.8 and an edge wave of 2.1%. These regions of irregularity were distinctly detected.

In conclusion, the present invention has the following special characteristics, proving itself highly capable of detecting the shape of flat products:

1. The relationship between the tension of flat products and the output from the detector, is expressed as a straight line, with the accuracy being less than 0.05 Kg/mm$^2$, which is equivalent to a steepness of wave of 0.1 to 0.2%, which is considered as an example of the shape of flat products.

2. Because of such practical problems as the structure of the fixing device of the detector, the resolution of the convention apparatus is only about 5 points. On the other hand, according to the present invention, a deflection detector of simple mechanism can be used, thereby improving the resolution to 10 to 20 points.

3. The checking capacity of disturbances in tension detection according to the present invention is so strong as to be 40 to 50 decibels even for disturbances due to the heaving of flat products, the deflection of the detector or for other reasons, thus all the problems due to disturbances having been practically solved.

4. The present invention can be applied to flat products of non-magnetic substance such as copper.

What is claimed is:

1. A method of detecting the shape of flat products, which comprises:
    applying, through an exciter, a time varying exciting signal generated in an exciting signal generator to an object along the width thereof, as an exciting force;
    concurrently detecting the deflection of said object taking place due to the application of said exciting force at a plurality of points along the width of said object; and
    correlating the exciting signal and the detected values of deflection in a signal processing circuit for determining the tension at respective points on said examined object, so as to develop the tension distribution along the width of said examined object, whereby the shape of said examined object may be determined.

2. The method claimed in claim 1, wherein the tension of the examined object is detected by using rectangular waves as the exciting force applied to said examined object, and by the integration of the detected value of deflection in synchronism with the driving signal.

3. The method claimed in claim 2, wherein the integrated value of said detected value of deflection is sample-held, and the so sample-held signal is displayed on a CRT monitor.

4. The method claimed in claim 2, wherein the period of the rectangular wave is between 1 and 4 seconds.

5. The method claimed in claim 1, wherein the tension of the examined object is detected by using a random signal as the exciting force applied to said examined object, and by the multiplication of the exciting signal with the deflection signal.

6. The method claimed in claim 1, wherein the tension of the examined object is detected by using a sine wave signal as the exciting force applied to said examined object, and by the multiplication of the exciting signal with the deflection signal.

7. An apparatus for detecting the shape of flat products, comprising: a plurality of exciters provided at a distance from the surface of the product being examined at locations along the width thereof; a plurality of detecting heads, each consisting of a plurality of deflection detectors, each of said deflection detectors being coupled with an exciter and operatively positioned for detecting deflection of the flat products; a rectangular wave generator coupled to said exciters; a plurality of signal transmitters, each connected to one of said deflection detectors; a plurality of signal processing circuits, one coupled to each of said transmitters, each signal processing circuit consisting of a device for changing polarity, an integration circuit, a sample-holding circuit and a timing signal generating circuit, said device for changing polarity coupled to receive signals from the respective transmitters and changing the polarity of detecting signals sent from said signal transmitters, said integration circuit coupled to said device for changing polarity and integrating the value of detection signals sent from said device for changing polarity, said sample-holding circuit coupled to said integration circuit and storing tension signals calculated in said integration circuit, and said timing signal generating circuit being connected with said rectangular wave signal generator, said device for changing polarity, said integration circuit and said sample-hold circuit for respectively controlling the timing change for said device for changing polarity, reset-timing for said integration circuit and sample-hold-timing for said sample-holding circuit.

* * * * *